United States Patent [19]

Dust et al.

[11] Patent Number: 5,717,015

[45] Date of Patent: Feb. 10, 1998

[54] DISSIPATIVE LAMINATING ADHESIVE

[75] Inventors: Richard A. Dust, Maidenhead, United Kingdom; Annie Nicole Frima, Saint Bernard, France

[73] Assignee: National Starch and Chemical Investment Holding Corporation, Wilmington, Del.

[21] Appl. No.: 799,655

[22] Filed: Feb. 11, 1997

Related U.S. Application Data

[63] Continuation-in-part of Ser. No. 459,591, Jun. 2, 1995, abandoned.

[51] Int. Cl.$^6$ .................................................. C08K 5/17
[52] U.S. Cl. .................................... 524/236; 524/913
[58] Field of Search ............................ 524/236, 913

[56] References Cited

U.S. PATENT DOCUMENTS

| | | | |
|---|---|---|---|
| 4,145,327 | 3/1979 | Dolch et al. | 260/29.6 MN |
| 4,301,040 | 11/1981 | Berbeco | 252/511 |
| 4,322,469 | 3/1982 | Nakano et al. | 428/212 |
| 4,490,433 | 12/1984 | Shigeru et al. | 428/262 |
| 4,491,894 | 1/1985 | Pitts | 361/212 |
| 4,618,630 | 10/1986 | Knobel et al. | 521/105 |
| 4,658,958 | 4/1987 | McNulty et al. | 206/328 |
| 4,699,677 | 10/1987 | Rooklyn | 156/71 |
| 4,806,571 | 2/1989 | Knobel et al. | 521/107 |
| 4,826,912 | 5/1989 | Ko et al. | 524/567 |
| 4,885,659 | 12/1989 | Nowell et al. | 361/212 |
| 4,900,777 | 2/1990 | Ball et al. | 524/819 |
| 4,902,573 | 2/1990 | Jonas et al. | 428/411.1 |
| 4,944,998 | 7/1990 | Ko et al. | 428/327 |
| 4,961,921 | 10/1990 | Chuang et al. | 424/47 |
| 4,981,544 | 1/1991 | Nordale | 156/252 |
| 5,004,562 | 4/1991 | Kissel | 252/518 |
| 5,043,839 | 8/1991 | Wallace | 361/220 |
| 5,182,169 | 1/1993 | Fukuda et al. | 428/343 |
| 5,238,975 | 8/1993 | Johnson et al. | 523/137 |

FOREIGN PATENT DOCUMENTS

| | | |
|---|---|---|
| 203 083 | 7/1983 | German Dem. Rep. |
| 56-149064 | 6/1981 | Japan. |

*Primary Examiner*—Jeffrey T. Smith
*Attorney, Agent, or Firm*—Jane E. Gennaro

[57] ABSTRACT

A dissipative waterborne laminating adhesive composition containing no conductive filler and comprising 90 to 99.5% by weight of an adhesive polymer prepared from vinyl or acrylic esters, blends thereof or blends thereof copolymerized with up to 30% ethylene and 0.5 to 10% by weight of a quaternary ammonium salts containing 1 to 7 carbon atoms.

6 Claims, No Drawings

DISSIPATIVE LAMINATING ADHESIVE

This application is a continuation-in-part of application Ser. No. 08/459,591 filed Jun. 2, 1995, now abandoned.

It is widely recognized that electrostatic discharge is a significant cause of failure of electronic equipment and that instituting static control measures is essential. The build up of static electricity and consequent damages resulting therefrom have given rise to a demand for materials that are static dissipative, i.e., materials wherein a surface charge may develop but will be subsequently dissipated by leakage to the ground. These dissipative materials differ from anti-static materials which minimize, if not prevent, the generation of static electricity.

These structures, particularly the flooring structures, are classified as being conductive, anti-static or dissipative. A flooring structure is considered anti-static if it has a resistance of $10^8$ to $10^{14}$ ohms. A flooring structure with this resistance does not create any static electricity but discharges static charges through the flooring at a very slow rate. Flooring structures with resistances between $10^5$ and $10^8$ ohms are considered dissipative. Dissipative flooring structures do not create any electrostatic charges and discharge any existing electrostatic charges slowly through the flooring. Conductive flooring structures have resistances of less than $10^5$ ohms and discharge electrostatic electricity at a very quick rate, but this rate might be so fast as to create a surge capable of damaging electrical components or to cause electrical shocks to individuals. Materials that are insulators have resistances of higher than $10^{14}$ ohms.

Thus, there is an increasing demand, particularly in business environments where large amounts of computerized equipment are found, for dissipative floorings and furniture laminates which will slowly allow any excess static electric discharge to dissipate through the flooring and into the grounding environment (e.g., the earth). In forming these constructions, it is also necessary not only that the substrates themselves be dissipative, but also that any adhesives utilized in the construction also exhibit dissipative properties.

Suitable laminating adhesives which are used in the construction of veneered furniture, high pressure laminate countertops, computer access flooring and the like must have a wide range of properties.. In particular, in the case of access flooring panels which are made from chipboard (which has been treated to become dissipative) sandwiched between two aluminum sheets, bonded to the chip with the laminating adhesive it is necessary, not only that they be dissipative, they must also exhibit a high degree of adhesive and cohesive strength, and, in particular must exhibit good adhesion to metals such as aluminum and other surfaces. Moreover, these properties must remain for very extended periods of time after the constructions are formed.

Previous attempts to provide adhesives for these applications have involved the use of solvent borne adhesives which were highly filled with carbon black to provide adequate dissipative properties. When environmental concerns mandated that the solvent borne adhesives be replaced by aqueous systems, problems were encountered in meeting the industrial requirements. The early aqueous adhesives were based on blends of ethylene vinyl acetate and carboxylated styrene butadiene rubber emulsions which additionally contained conventional plasticizers, fillers, adhesion promoters and the like. However, the dried films of these materials were resistant and therefore did not inherently process dissipative properties.

While the addition of carbon black can provide some dissipative properties, it is difficult to control, particularly in the dissipative range, and performance could be lost on aging. This loss in dissipative properties of many prior water based adhesives may be related to their retaining some moisture which is lost over a period of time, particularly in low humidity environments.

While long chain quaternary ammonium salts are known to confer anti-static properties, they tend to be surface seeking and rely on surface conductance for this dissipative effect. Moreover, their tendency to migrate to the surface reduces the bond, particularly to the aluminum, to an unacceptable level. They are therefore not useful in water based adhesives for the lamination of dissipative chipboard to metal sheets for the production of access flooring panels, since it is essential that the charge be conducted through the bulk of the adhesive.

SUMMARY OF THE INVENTION

We have now found that the aforementioned disadvantage can be overcome by the incorporation in conventional waterborne adhesives of 0.5 to 10%, preferably 1 to 3% and most preferably about 1.5%, by weight (based on a 40 to 65% solids emulsion) of a quaternary ammonium salt having a $C_1$ to $C_7$ side chains, preferably $C_1$ to $C_4$, hydrocarbon or modified hydrocarbon chain. The use of such short chain hydrocarbons in place of long chains or polymeric hydrocarbons provides the required dissipative properties without sacrificing adhesion since the short chain polymers remain distributed in the adhesive composition in contrast to the longer chain polymers which have a tendency to migrate to the surface of the adhesive. Such migrating species are found to reduce adhesion to a level that is unacceptable for a flooring panel. When utilizing the teachings of the present invention, adhesive films can readily be prepared which exhibit a resistance within the dissipative range of $10^8$ to $10^5$ ohms for extended periods of time even in low humidity environments. Moreover, this dissipative result is obtained without sacrifice of the adhesive properties.

Any conventional waterborne laminating adhesive may be made dissipative by the addition of these short chain quaternary ammonium salts. Generally, these adhesives are based on vinyl ester, acrylates or blends thereof, often in combination with rubber latices.

Particularly, this invention is an improvement to a dissipative waterborne laminating adhesive composition containing no conductive filler and suitable for bonding a nonmetallic substrate to a metallic substrate. The laminating adhesive comprises 90–99.5% by weight of an adhesive polymer prepared from vinyl or acrylic esters, blends thereof or blends thereof copolymerized with up to 30% ethylene, and as improved further comprises 0.5 to 10% by weight of a quaternary ammonium salt containing 1 to 7 carbon atoms in an amount effective to cause the bonded substrates to have a resistance between $10^5$ to $10^8$ ohms.

DETAILED DESCRIPTION OF THE PREFERRED EMBODIMENTS

Representative of the short chain quaternary ammonium salts useful herein are di-methyl ammonium chloride, tri-ethyl ammonium chloride, di-ethanol amine hydrochloride and tri-ethanol amine hydrochloride, as well as the corresponding bromides.

In particular, it has been found that the best results are obtained using salts which contain two hydrocarbon groups rather than three or four. Dimethyl ammonium chloride, as well as the corresponding bromides, are thus preferred.

The vinyl or acrylic esters may be used alone or may be copolymerized with up to about 30% by weight of ethylene using techniques well known in the art. Representative of such polymers are vinyl or acrylic based copolymers including vinyl acetate copolymers with at least one copolymerizable comonomer such as another vinyl ester (e.g., vinyl-2-ethylhexanoate), $C_1$ to $C_8$ alkyl esters of maleic and fumaric acid ethylene; acrylate esters or polymers of styrene/acrylic monomers including alkyl acrylates or ethylenically unsaturated esters of acrylic or methacrylic acid containing 1 to 8 carbon atoms in the alkyl group. The corresponding methacrylate esters may also be used, as may mixtures of any of the above, provided the Tg of the polymer is greater than about $-5°$ C.

Certain copolymerizable monomers which assist in the stability of the copolymer emulsion, e.g., vinyl sulfonic acid and 2-acrylamido-2-methylpropane sulfonic acid may also be used herein as latex stabilizers. These stabilizers are added in amounts of from about 0.2 to 3% by weight of the monomer mixture.

Conventional batch, semi-batch or continuous polymerization procedures may be utilized herein. Generally, the monomers are polymerized in an aqueous medium (under pressures not exceeding 100 atmospheres if ethylene is employed) in the presence of a catalyst and at least one emulsifying agent.

If ethylene is used in the polymerization, the quantity of ethylene entering into the copolymer is influenced by the pressure, the agitation and the viscosity of the polymerization medium. Thus, to increase the ethylene content of the copolymer, higher pressures are employed. A pressure of at least about 10 atmospheres is most suitably employed. The mixture is thoroughly agitated to dissolve the ethylene, the agitation being continued until substantial equilibrium is achieved. This generally requires about 15 minutes; however, more or less time may be required depending upon the vessel, the efficiency of the agitation, the specific system and the like.

Suitable as polymerization catalysts are the water-soluble free-radical-formers generally used in emulsion polymerization, such as hydrogen peroxide, sodium persulfate, potassium persulfate and ammonium persulfate, as well as tertbutyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, ascorbic acid, sodium sulfite, sodium thiosulfate, as redox catalysts in amounts of 0.01 to 3% by weight, preferably 0.01 to 1% by weight, based on the total amount of the emulsion. The free-radical-formers can be charged with the surfactants or protective colloid or be added during the polymerization in doses.

The polymerization can be carried out at a pH of between 2 and 10, preferably between 2 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The polymerization is carried out using surfactants or protective colloids as the stabilizing agent. The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable non-ionic emulsifiers are the addition products of 3 to 100 moles of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably about 2 to about 8, weight percent of the monomers used in the polymerization.

The emulsifier used in the polymerization can also be added, in its entirety, to the initial charge to the polymerization zone or a portion of the emulsifier, e.g., from 90 to 25 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, hydroxyethyl cellulose, gum arabic, and the like, as known in the art of synthetic emulsion polymer technology. In general, these colloids are used at levels of 0.05% to 4% by weight based on the total emulsion.

The reaction is generally continued until the residual monomer level is less than about 0.1%.

Optionally, the acrylic or vinyl ester homo- or copolymers may be blended with emulsions of synthetic or natural rubber based materials such as styrene/butadiene, carboxylated styrene/butadiene, styrene/isoprene-styrene, styrene/butadiene/styrene and the like in ratios of 90:10 to 65:35 vinyl ester to rubber, based on the dry weight of the components. Particularly preferred results have been obtained by the addition of carboxylated rubbers, especially carboxylated styrene butadienes.

The dissipative adhesive of the invention is formulated by blending the vinyl ester containing polymer, the rubber polymer when present, the short chain ammonium salt and conventional adhesive additives such as adhesion promoters (e.g., ammonium silica fluoride), defoamers, biocides, plasticizers, fillers, thickeners or rheology modifiers and the like. It will be recognized that the choice of additives depends in part on the adhesive base as well as the types of substrates to be bonded.

It may also be desirable, particularly in the case of an existing adhesive emulsion which has not been made specifically for this purpose, to post-add small amounts, i.e., about 2 to 4% of a "hard" polymer, i.e., a polymer having a Tg above about 0° C. in order to compensate for any softening of the adhesive resulting from the addition of the relatively hygroscopic salts. A suitable hard monomer is polyvinyl acetate. For this same reason, if the adhesive emulsion is formulated specifically for these dissipative applications, it may be desirable to choose the monomers so as to obtain a polymer having a fixed Tg in the range of about $-5°$ to $30°$ C.

EXAMPLES

A standard commercial adhesive formulation was prepared from the following components:

62.7 p Ethylene vinyl acetate emulsion (PVOH Stabilized containing 15% ethylene at 55% solids)
0.2 p Defoamer
0.2 p Preservative
1.45 p Water
0.15 p Adhesion Promoter (Ammonium Silica fluoride)
3.5 p Dibutyl phthalate plasticizer
14.8 p Inert Fillers
16.0 p Carboxylated styrene butadiene (45% solids)
2.0 p Vinyl acetate homopolymer Various quaternary ammonium salts were added to the adhesive and tested using the following procedure.

TESTING

Resistance values were taken across a dried film of adhesive at approximately 40 gsm. Values are taken after drying at 120° C. (5 minutes) and on air drying. The latter represents the practical condition, while drying at 120° C. gives a measure of how well the additive retains moisture. Values of $10^8$ to $10^5$ are preferred for dissipative applications.

The adhesive film (40 grams per square meter dry coat weight) was coated onto chipboard using a wire wound bar. Aluminum (0.6 to 2 mm in thickness) was bonded thereto using pressure overnight. After 24 hours the bonds were tested by hand pulling the aluminum. The bonds were assessed for the difficulty of removal and the amount of the chip fiber removal. Where the bonds failed, the aluminum came from the chipboard very easily without deformation, indicating virtually no bond had formed.

The table lists the results obtained with the optimum class of product (quaternary salts), and indicates their structures. The following abbreviations are used:

DMAC Di-methyl ammonium chloride
TEAB Tri-ethyl ammonium bromide
TEAC Tri-ethyl ammonium chloride
TOAB Tri-octyl ammonium bromide
MTMAB Myristyl tri-methyl ammonium bromide
DEOAHM Di-ethanol amine hydrochloride
TEOAHC Tri-ethanol amine hydrochloride

| Additive | Level % | Resistance through Film 120° C. (5 mins.) | RT (equilib) | Bond |
|---|---|---|---|---|
| — | | >$10^9$ | >$10^9$ | Good Bond |
| DMAC | 0.67 | $4 \times 10^8$ | $2.5 \times 10^5$ | Good Bond |
| DMAC | 1.3 | $2 \times 10^7$ | $1 \times 10^5$ | Good Bond |
| DMAC | 2 | $1.5 \times 10^7$ | $1 \times 10^5$ | Good Bond |
| TEAB | 2 | $3 \times 10^8$ | $6 \times 10^5$ | Good Bond |
| TEAC | 2 | $10^9$ | $1 \times 10^7$ | Fair Bond |
| TOAB | 2 | N/T | N/T | No bond could be obtained |
| MTMAB | 2 | $10^9$ | $4 \times 10^7$ | No Bond |
| DEOAHC | 2 | $1.2 \times 10^6$ | $2 \times 10^5$ | Good Bond |
| TEOAHC | 2 | $6 \times 10^7$ | $3 \times 10^7$ | Good Bond |

N/T = Not tested

The results presented in Table I show that the best choice is quaternary salts with short carbon chains, i.e., 7 or less, preferably 4 or less (which can be substituted). If the chain length increases the bond is lost. Moreover, the shorter the chain the better the electrical properties. Laminates prepared with the adhesive containing 1.5% DMAC were maintained their dissipative properties even after two years of natural ageing.

Similar results would be achieved using other emulsion adhesives such as those adhesives based on vinyl ester, acrylates or blends thereof, often in combination with rubber latices.

We claim:

1. In a dissipative waterborne laminating adhesive composition suitable for bonding a nonmetallic substrate to a metallic substrate, the laminating adhesive characterized as containing no conductive filler and comprising 90–99.5% by weight of an adhesive polymer prepared from vinyl or acrylic esters, blends thereof or blends thereof copolymerized with up to 30% ethylene, the improvement in which the laminating adhesive further comprises 0.5 to 10% by weight of a quaternary ammonium salt containing 1 to 7 carbon atoms in an amount effective to cause the bonded substrates to have a resistance between $10^5$ to $10^8$ ohms.

2. In the adhesive of claim 1, the improvement wherein the quaternary ammonium salt is selected from the group consisting of di-methyl ammonium chloride, tri-ethyl ammonium bromide, tri-ethyl ammonium chloride, di-ethanol amine hydrochloride and tri-ethanol amine hydrochloride.

3. In the adhesive of claim 1, the improvement wherein the quaternary ammonium salt is present in an amount of 1 to 3% by weight of the adhesive polymer.

4. A process for rendering dissipative waterborne acrylic or vinyl ester based adhesive compositions suitable for bonding a nonmetallic substrate to a metallic substrate and characterized as containing no conductive filler, the process comprising the step of adding to the adhesive 0.5 to 10% by weight of a quaternary ammonium salt containing 1 to 7 carbon atoms in an amount effective to cause the bonded substrates to have a resistance between $10^5$ to $10^8$ ohms.

5. The process of claim 4 wherein the quaternary ammonium salt is selected from the group consisting of di-methyl ammonium chloride, tri-ethyl ammonium bromide, tri-ethyl ammonium chloride, di-ethanol amine hydrochloride and tri-ethanol amine hydrochloride.

6. The process of claim 4 wherein the quaternary ammonium salt is present in an amount of 1 to 3% by weight of the adhesive polymer.

* * * * *